Figure 1:
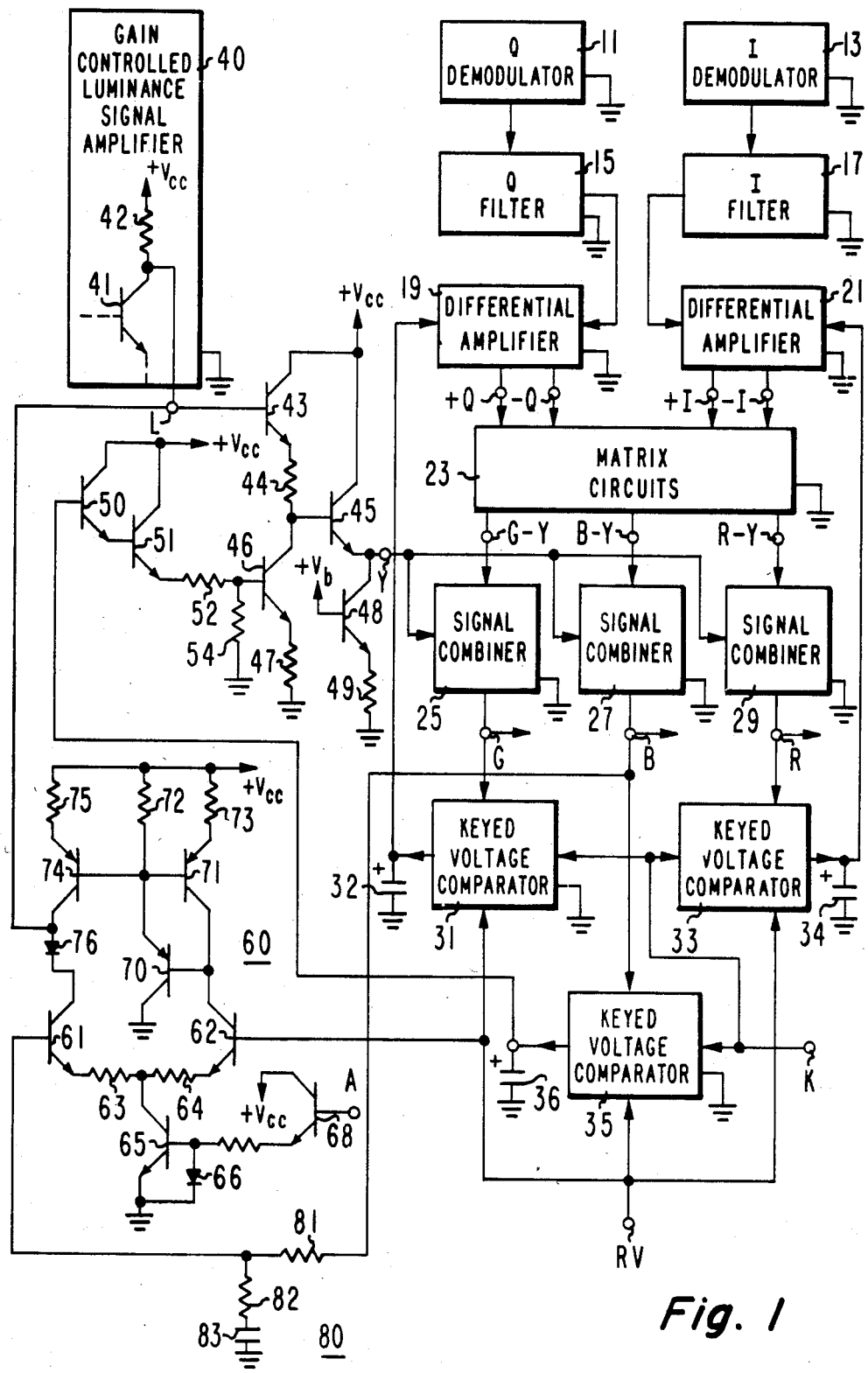

United States Patent [19]

Shanley, II

[11] Patent Number: 4,549,203

[45] Date of Patent: Oct. 22, 1985

[54] DC STABILIZATION SYSTEM

[75] Inventor: Robert L. Shanley, II, Indianapolis, Ind.

[73] Assignee: RCA Corporation, Princeton, N.J.

[21] Appl. No.: 561,281

[22] Filed: Dec. 14, 1983

[51] Int. Cl.$^4$ .............................................. H04N 5/68
[52] U.S. Cl. ......................................... 358/34; 358/74
[58] Field of Search .................... 358/21 R, 33, 34, 74, 358/242, 243

[56] References Cited

U.S. PATENT DOCUMENTS

| | | | |
|---|---|---|---|
| 4,183,050 | 1/1980 | Tsuchiya et al. | 358/34 |
| 4,263,622 | 4/1981 | Hinn | 358/74 |
| 4,484,228 | 11/1984 | Parker | 358/74 |

*Primary Examiner*—Michael A. Masinick
*Attorney, Agent, or Firm*—W. H. Meagher; P. J. Rasmussen; E. M. Whitacre

[57] ABSTRACT

DC stabilization system for color signal inputs to kinescope drivers of a color TV receiver (of a type employing AKB control) includes four control loops, one serving to adjust DC level of I color-difference signal, one serving to adjust DC level of Q color-difference signal, and two serving to adjust DC level of the Y (luminance) signal. One of the Y-adjusting control loops, employing a voltage comparator enabled only during periodic kinescope bias control intervals recurring at a field rate, is provided with an effective time constant which is short relative to the duration of a line interval. The other of the Y-adjusting control loops, employing a voltage comparator enabled only during backporch blanking portions of line intervals lying outside of the recurring kinescope bias control intervals, is provided with an effective time constant which is long relative to the duration of a line interval.

7 Claims, 3 Drawing Figures

DC STABILIZATION SYSTEM

The present invention relates generally to DC stabilization systems for use in color television receivers, and particularly to systems for stabilizing the DC levels of the respective color signal drives for a color kinescope in receivers of the type incorporating apparatus for automatic control of color kinescope biasing.

An illustrative arrangement for automatic control of color kinescope biasing in a color television receiver is that described in U.S. Pat. No. 4,263,622- Hinn. In the Hinn arrangement, a control period, occupying a period of several successive line intervals within each vertical blanking interval, is set aside for monitoring a black level current produced by an electron gun under reference signal conditions, for detection of departures from a desired current level, and for readjustment of gun bias to oppose the undesired departures. During a portion of the control period, the color kinescope grid receives a conduction-enhancing pulse; bias control is based upon information derived as indicative of the change in cathode current level introduced by the grid pulsing. An advantageous system for utilization of the above-described Hinn approach in maintenance of an appropriate bias relationship among the color kinescope's gun trio (in the face of aging and other parameter variations) is described in the copending U.S. Pat. No. 4,484,228 of R. P. Parker.

For successful use of automatic kinescope bias (AKB) control in the manner exemplified by the structures of the aforementioned Hinn patent and Parker patent application, it is recognized in my copending U.S. Pat. application Ser. No. 561,176 entitled "Control System For Luminance/Chrominance Signal Processing Circuits" (concurrently filed herewith), that the luminance/chrominance signal processing circuits, which process signal information for delivery to the color kinescope during the time periods intervening the periodically recurring kinescope bias control intervals, require some suitable form of manipulation during the kinescope bias control intervals to avoid undesirable disturbance or contamination of the current monitoring and bias adjustment functions.

The luminance/chrominance signal processing circuits of a color television receiver conventionally serve to process the luminance and chrominance components of received composite color television signals so as to derive therefrom a set of three color signals for delivery to a color kinescope to acheive a color image reproduction. Stability of the DC levels of the delivered color signals is important to achievement of faithful color renditions in the reproduced image. It is the particular concern of the present invention to provide a system for such DC level stabilization that will also facilitate accurate operation of AKB control circuits incorporated in the receiver.

In accordance with the principles of the present invention, a color television receiver is advantageously provided with a DC stabilization system including a pair of control loops, both functioning to adjust the DC level of the luminance signal contribution to the formation of the set of color signals. One of the control loops includes a first keyed comparator, enabled only during gating intervals within horizontal blanking portions of line intervals which lie outside of the kinescope bias control intervals. The first keyed comparator serves to compare a reference voltage with the voltage attained by one of the color signals during said gating intervals. The first comparator output is applied to the receiver's luminance channel to oppose departures of said attained color signal voltage from substantial equality with the reference voltage. The other of the pair of control loops includes a second keyed comparator, enabled only during each of said kinescope bias control intervals, and serving to compare said reference voltage with the voltage attained by said one of the color signals during said kinescope bias control intervals. The second comparator output is applied to the receiver's luminance channel to oppose departures of said attained color signal voltage from substantial equality with the reference voltage.

Illustratively, the output of the first keyed comparator is stored by a capacitor during the periods intervening successive gating intervals, with the capacitor value chosen to provide the first control loop with an effective time constant which is long relative to a line interval so as to substantially avoid horizontal, as well as vertical, shading effects. In contrast, the effective time constant of the second control loop is short relative to a line interval duration.

As described in my aforementioned copending U.S. patent application entitled "Control System For Luminance/Chrominance Signal Processing Circuits", it is desirable to set the luminance amplifier gain to a minimum value (independent of the viewer's contrast or picture control adjustments) during each kinescope bias control interval so as to protect AKB operations from disturbance by received signal components. However, full protection of the AKB operations may be compromised by signal leak-through (of VITS signal components, for example) occuring in the luminance amplifier under the minimum gain conditions. The fast-acting second control loop, described above, provides a facility for lessening the adverse effects of any such signal leak-through by introducing significant degeneration at the video signal frequencies.

The above-described two-loop arrangement for adjustment of the DC level of the luminance signal contribution to the formation of the color signal outputs is desirably accompanied by additional control loops for adjustment of the DC levels of the color-difference signal contributions to color signal formation.

In accordance with an illustrative embodiment of the present invention, employed in a color television receiver wherein I and Q color-difference signals are recovered by synchronous detection of received chrominance signals and matrixed to form a set of color-difference signals of R-Y, B-Y and G-Y form, the DC stabilization system includes a third control loop adjusting the DC level of the I signal input to the matrixing operation, and a fourth control loop adjusting the DC level of the Q signal input to the matrixing operation. The third and fourth control loops, with long effective time constants comparable to the first control loop's time constant, include respective third and fourth keyed comparators, enabled during gating intervals corresponding to those associated with the operation of the first keyed comparator. The third keyed comparator illustratively serves to compare the voltage attained by the red color signal during the gating intervals with the aforementioned reference voltage, while the fourth keyed comparator illustratively serves to compare the voltage attained by the green color signal during the gating intervals with the aforementioned reference voltage. Under these illustrative circumstances, the first and second keyed comparators are rendered responsive to the blue color signal.

Figure 1A:
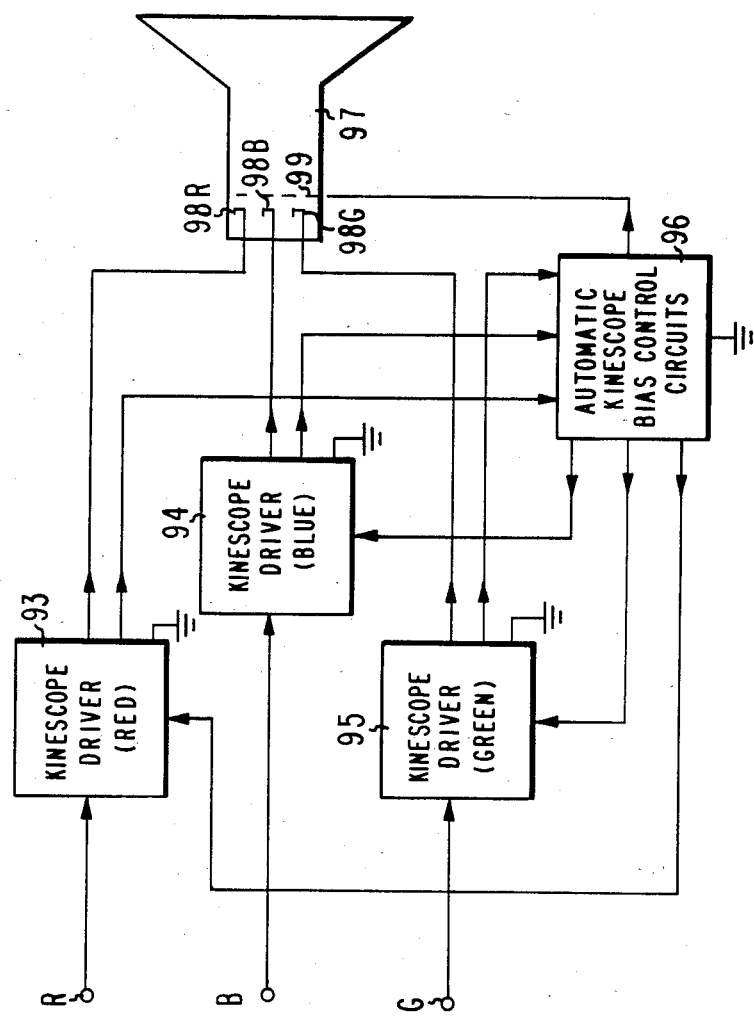
Figure 2:
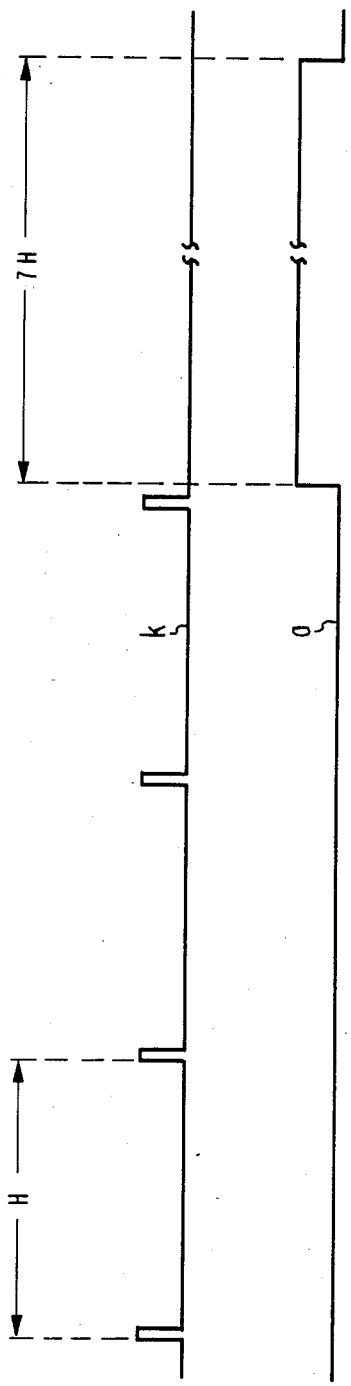

In the accompanying drawings,

FIG. 1 and 1a illustrate, partially schematically and partially by block representation, cooperating portions of a color television receiver incorporating a DC stabilization system in accordance with an embodiment of the present invention; and FIG. 2 illustrates graphically waveforms of aid in explaining the operation of the FIG. 1 system.

The color television receiver portion illustrated in FIG. 1 includes a gain controlled luminance signal amplifier 40. The circuitry (only partially illustrated) of amplifier 40, which processes the luminance signal component of received composite color video signals, includes an output NPN transistor 41, having a collector electrode connected to the positive terminal ($+V_{cc}$) of an operating potential supply via a load resistor 42. The luminance signal output of amplifier 40, developed across load resistor 42, appears at the amplifier output terminal L.

The amplifier output terminal L is directly connected to the base electrode of an NPN transistor 43, disposed in an emitter-follower configuration with its collector electrode directly connected to the $+V_{cc}$ supply terminal. The emitter electrode of transistor 43 is connected via a resistor 44 to the collector electrode of an NPN current source transistor 46, which has its emitter electrode returned via a resistor 47 to the negative terminal (ground) of the operating potential supply. Transistors 43 and 46 cooperate with resistor 44 to form a luminance signal translating circuit of the level shifting type, subject to control in a manner to be described subsequently.

Level shifted luminance signals, appearing at the collector electrode of transistor 46, are coupled via the base-emitter path of an NPN emitter-follower transistor 45 to a luminance signal output terminal Y. The collector electrode of transistor 45 is directly connected to the $V_{cc}$ terminal. An NPN transistor 48, functioning as a current source for the emitter-follower transistor 45, is disposed with its collector electrode directly connected to terminal Y, with its emitter electrode returned to ground via a resistor 49, and with its base electrode connected to the positive terminal ($+V_b$) of a suitable bias potential supply.

The luminance signals appearing at terminal Y are supplied to respective inputs of a trio of signal combiners 25, 27, 29. The signal combiners 25, 27, 29 function to combine the luminance signals with respective color-difference signals derived from the chrominance component of the received composite color video signals, to form a set of green, blue and red color signals at respective combiner output terminals G, B and R.

For signal recovery from the received chrominance component, the color television receiver's chrominance signal channel includes a pair of color demodulators 11, 13. The output of demodulator 11, which recovers a Q color-difference signal by conventional synchronous detection techniques, is subject to appropriate filtering by a Q filter 15, and then supplied as a signal input to a differential amplifier 19. The output of demodulator 13, which recovers an I color-difference signal by conventional synchronous detection techniques, is subject to appropriate filtering by an I filter 17, and then supplied as a signal input to a differential amplifier 21. Differential amplifiers 19 and 21 also receive control inputs from apparatus to be described subsequently. Push-pull versions of the Q color-difference signals, appearing at respective output terminals +Q and −Q, of differential amplifier 19, and push-pull versions of the I color-difference signals, appearing at respective output terminals, +I and −I, of differential amplifier 21, are supplied as inputs to matrix circuits 23.

Matrix circuits 23, illustratively of the general form disclosed in U.S. Pat. No. 4,272,778 -Harwood, et al., provide appropriate combinations of the input signals to develop a green color-difference signal at an output terminal G-Y, a blue color-difference signal at an output terminal B-Y, and a red color-difference signal at an output terminal R-Y. The signals at terminals R-Y, B-Y and G-Y serve as the respective color-difference signal inputs to the aforementioned signal combiners 25, 27 and 29.

Before considering the DC stabilization system elements of the FIG. 1 arrangement, it is appropriate to consider the FIG. 1a showing of apparatus for utilizing the respective color signals at the combiner output terminals R, B and G. As shown in FIG. 1a, a trio of kinescope drivers 93, 94, 95 are provided, responsive respectively to the red color signal appearing at terminal R, the blue color signal appearing at terminal B, and the green color signal appearing at terminal G.

Display of color images in response to the trio of color signals is effected on the viewing screen of a color kinescope 97, incorporating an electron gun assembly comprising individually energized cathode electrodes 98R, 98B and 98G and a commonly energized control grid structure 99. The red content of the displayed color image is determined by control of the intensity of an electron beam emanating from cathode 98R, which is driven by the output of kinescope driver 93. The blue content of the displayed color image is determined by control of the intensity of an electron beam emanating from cathode 98B, which is driven by the output of kinescope driver 94. The green content of the displayed color image is determined by control of the intensity of an electron beam emanating from cathode 98G, which is driven by an output of kinescope driver 95.

The FIG. 1a apparatus also includes automatic kinescope bias control circuits 96, which desirably operate in the manner described in the aforementioned Parker patent application. Thus, the bias control circuits 96 include means for supplying a conduction-enhancing pulse to the kinescope control grid 99 during a predetermined portion of the bias control interval (which interval, illustratively, occupies a period of seven-lines duration during a post-sync portion of each vertical blanking interval of the received signal). The bias control circuits 96 are responsive to inputs derived from the respective drivers (93, 94, 95) for sensing beam current changes induced by the grid pulsing, and develop therefrom respective DC outputs for application to the respective drivers (93, 94, 95) to suitably control the biases of the respective kinescope cathodes (98R, 98B, 98G) to which the driver outputs are DC coupled. As explained in my previously mentioned copending patent application entitled "Control System For Luminance/Chrominance Signal Processing Circuits", for protection of the integrity of the AKB operations effected by the control circuits 96, luminance amplifier 40 (FIG. 1) is desirably keyed to a minimum gain condition throughout each kinescope bias control interval.

The manner in which the DC levels of the respective color signal inputs to the drivers (93, 94, 95) are controlled will now be explained, with reference to a stabilization system illustrated in FIG. 1 which includes a trio of keyed voltage comparators 31, 33 and 35. Each of the comparators 31, 33 and 35 is enabled only during keying periods established in response to a keying wave appearing at terminal K. As illustratively shown by waveform "k" of FIG. 2, the keying wave at terminal K comprises a train of positive-going pulses, recurring at a line rate and timed to coincide with a "backporch" portion of horizontal blanking intervals of the received signal, but subject to disappearance during the aforementioned kinescope bias control intervals.

Comparator 31 accepts the green color signal from terminal G for comparison with a reference input derived from a reference voltage terminal RV, and develops its output across a storage capacitor 32. The red color signal at terminal R is subject to comparison with the same reference voltage (from terminal RV) in comparator 33, which develops its output across storage capacitor 34. The blue color signal at terminal B is also subject to comparison with the reference voltage appearing at terminal RV in comparator 35, which develops its output across storage capacitor 36.

A DC potential is developed across capacitor 32 which is representative of the difference, if any, existing between the green signal and reference inputs to comparator 31 during the aforementioned "backporch" keying periods, and is held during the intervals between successive keying periods. This DC potential is supplied as an input to differential amplifier 19, to modify the DC level of the Q color-difference signal input to matrix circuits 23 in a direction tending to reduce the difference between the inputs of comparator 31. Similarly, the DC potential stored across capacitor 34 (representative of the difference, if any, existing between the red signal and reference inputs to comparator 33 during the "backporch" keying periods) is supplied as an input to differential amplifier 21, to modify the DC level of the I color-difference signal inputs to matrix circuits 23 in a direction tending to reduce the difference between the inputs of comparator 33.

The DC potential stored across capacitor 36, which is representative of the difference, if any, existing between the blue signal and reference inputs to comparator 35 during the "backporch" keying periods, is utilized to modify the DC level of the luminance signal input to combiners 25, 27, 29 in a direction tending to reduce the difference between the inputs of comparator 35. For this purpose, the DC potential across capacitor 36 is applied to the base electrode of an NPN transistor 50, disposed as an emitter-follower, with its collector electrode directly connected to the $+V_{cc}$ supply terminal. The emitter electrode of transistor 50 is connected to the base electrode of an additional NPN emitter-follower transistor 51, also disposed with its collector electrode directly connected to the $V_{cc}$ supply terminal. The emitter electrode of transistor 51 is returned to ground via the series combination of resistors 52 and 54. The junction of resistors 52, 54 is directly connected to the base electrode of the current source transistor 46 in the previously mentioned level shifting circuit 43-44-46. A translated version of the output of comparator 35 accordingly controls the magnitude of current drawn by current source transistor 46 through resistor 44, and is thus determinative of the luminance signal level shift introduced by the DC voltage drop across resistor 44.

In addition to the three keyed voltage comparators (31, 33, 35) discussed above, the system of FIG. 1 includes a fourth keyed voltage comparator employing a differential amplifier 60. Differential amplifier 60 is formed by a pair of NPN transistors 61, 62 with emitter electrodes interconnected via the series combination of resistors 63 and 64. A current source for differential amplifier 60 is formed by an NPN transistor 65, disposed with its collector electrode connected to the junction of resistors 63 and 64, and with its emitter electrode grounded. The base-emitter path of transistor 65 is shunted by a diode 66, with its anode connected to the base electrode of transistor 65 and with its cathode grounded.

An NPN transistor 68 is disposed as an emitter-follower for supplying a keying wave to the base electrode of the current source transistor 65. The emitter electrode of transistor 68 ia connected via a resistor 67 to the base electrode of current source transistor 65, while the collector electrode of transistor 68 is directly connected to the $+V_{cc}$ supply terminal.

The base electrode of the emitter-follower transistor 68 is connected to terminal A, at which keying waves, of the illustrative form shown by waveform "a" of FIG. 2, are developed. Keying wave "a" comprises a train of positive-going pulses which recur at a field rate, and each of which is timed to coincide with one of the aforementioned kinescope bias control intervals. During the appearances of the pulse components of keying wave "a", current source transistor 65 is rendered conducting to enable the differential amplifier 60, which is disabled during all other intervals.

The differential amplifier 60 is provided with an active load circuit employing a trio of PNP transistors 70, 71, 74, with the collector electrode of amplifier transistor 62 directly connected to the collector electrode of load transistor 71, and with the collector electrode of amplifier transistor 61 linked to the collector electrode of load transistor 74 via a forward-biased diode 76 (disposed with its anode connected to the collector electrode of transistor 74, and with its cathode connected to the collector electrode of transistor 61). The emitter electrodes of load transistors 71 and 74 are returned to the $+V_{cc}$ supply terminal via respective emitter resistors 73 and 75. The remaining PNP transistor 70 is disposed with its collector electrode grounded, with its base electrode directly connected to the joined collector electrodes of transistors 62 and 71, and with its emitter electrode returned via an emitter resistor 72 to the $+V_{cc}$ supply terminal, and directly connected to the base electrodes of the load transistors 71 and 74.

The above-described disposition of transistors 70, 71, and 74 forms a current mirror arrangement wherein the collector current of load transistor 74 mirrors the collector current of amplifier transistor 62. An output lead directly links the collector electrode of load transistor 74 with the previously mentioned terminal L (at the base electrode of the luminance signal translating emitter-follower transistor 43).

If the potentials at the base electrodes of amplifier transistors 61, 62 are balanced during a period of enablement of differential amplifier 60, the collector current demand of transistor 61 is matched in magnitude with the current supplied via the collector electrode of load transistor 74, and the differential amplifier output provides no disturbance of the potential at the base electrode of transistor 43. If, however, an imbalance exists such that the potential at the base electrode of transistor 62 is elevated relative to the potential at the base electrode of transistor 61 during an enablement period, the magnitude of the current supplied via the electrode of load transistor 74 exceeds the collector current demand of transistor 61, with the excess supplied via the output lead to result in elevation of the potential at terminal L. Conversely, if a base potential imbalance of the opposite sense exists during an enablement period, the collector current demand of transistor 61 exceeds the magnitude of current supplied via the collector electrode of load transistor 74, with the consequence that the deficit is supplied from the output lead, resulting in a depression of the potential at terminal L.

A reference voltage is supplied to one input of the differential amplifier 60 via the direct connection of the base electrode of amplifier transistor 62 to the reference voltage supply terminal RV. A signal voltage is supplied to the other input of the differential amplifier 60 by means of the connection of the base electrode of transistor 61 via series resistor 81 to the blue color signal output terminal B. The series combination of a resistor 82 and a capacitor 83 is connected between the base electrode of transistor 61 and ground, and cooperates with series resistor 81 to form a low pass filter (80) for the blue color signal applied to the differential amplifier 60.

The output of a differential amplifier 60 is thus sensitive to departures, if any, of the blue color signal from substantial equality with the reference voltage at terminal RV during each enablement period, and the sense of the control it exerts upon the signal delivered to terminal Y is such as to oppose such departures.

In the stabilization system described above, it is desired to substantially avoid image shading effects that would accompany failure to hold the control voltages developed across capacitors 32, 34, 36 during the periods intervening successive enablement periods for comparators 31, 33, 35. Accordingly, relatively large capacitance values (e.g., 10 microfarads) are employed for capacitors 32, 34, 36, providing effective time constants for the three control loops utilizing comparators 31, 33, 35 which are long relative to the duration of a line interval.

In contrast, the control loop utilizing differential amplifier 60 employs no output storage capacitor and is provided with an effective time constant which is quite short relative to the duration of a line interval. The limit on the speed of response of the latter control loop is imposed by the low pass filter 80, introduced as a loop filter to insure stability. With illustrative values for filter elements 81, 82, 83 of 36 kilohms, 4 kilohms, and 20 picofarads, respectively, significant loop response is obtained at frequencies encompassing an appreciable portion of the luminance signal band.

In operation of the above-described stabilization system, the levels of the three color signals delivered to the kinescope drivers are stabilized against the effects of DC drifts in the receiver's luminance or chrominance channels by a system of three long-time-constant control loops (33, 34, 21; 31, 32, 19; 35, 36, 46) effecting level corrections of the I, Q, and Y signal components from which the three color signals are derived. Level correction of the Y signal component by one of the long-time-constant control loops (35, 36, 46) is augmented by the operation of an additional Y-correcting control loop (80, 60, 43) active only during the periodic kinescope bias control intervals (when the other three control loops are maintained in a "hold" state). By providing the additional control loop with a short time constant permitting fast response, disturbances of the color signal outputs during AKB operations by received signal components such as VIT (vertical interval test) signals (which may leak through the gain-controlled luminance amplifier 40, even though the latter is desirably keyed to a minimum gain condition during each kinescope bias control interval) are substantially precluded. The additional control loop, moreover, protects the AKB operations from adverse effects of any luminance signal level shift that may undesirably accompany the aforementioned luminance amplifier keying to a minimum gain condition.

It may be noted that in one desirable arrangement for utilizing the present invention, means are incorporated for precluding the keying of comparators 31, 33 and 35 during at least a portion of the received signal's vertical sync interval, for error reduction purposes, as explained in a copending U.S. Pat. application of R. Shanley, et al., entitled "Keyed DC Stabilization System With Protection From Error Introduction During Vertical Sync Interval" and concurrently filed herewith. In use of such an arrangement, the keying wave "k" will be free of positive-going keying pulse components during the selected vertical sync interval portion.

What is claimed is:

1. In a color television receiver for displaying color images in response to composite video signals inclusive of respective image-representative luminance and chrominance components, said image-representative components being absent during horizontal blanking portions of successive line intervals within periodic field intervals, and also absent during the vertical blanking portion of each field interval, said receiver including: a color kinescope having a plurality of beam intensity control electrodes for controlling the intensity of a plurality of electron beams tracing a raster of scanning lines upon a viewing screen; means for automatically controlling the bias on the respective control electrodes during periodic bias control intervals encompassing a plurality of successive line intervals within each of said vertical blanking portions; a luminance signal channel for processing said luminance component and including a luminance signal translator; a chrominance signal channel for processing said chrominance signal component, and including means responsive to said chrominance signal component for developing a plurality of color-difference signal outputs; a signal combiner responsive to one of said color-difference signal outputs and to an output of said luminance signal translator for forming a first color signal; and means for applying said first color signal to one of said kinescope electrodes; a DC stabilization system comprising:

a first control loop for controlling the DC level of the output of said luminance signal translator including:

a first keyed voltage comparator, having a first input terminal coupled to receive a reference voltage and a second input terminal coupled to receive said first color signal, said first voltage comparator being keyed into operation during gating intervals within those horizontal blanking portions of line intervals which lie outside of said bias control intervals;

a second keyed voltage comparator, having a first input terminal coupled to receive said reference voltage and a second input terminal coupled to receive said first color signal, said second voltage comparator being keyed into operation only during said bias control intervals; and means, coupled to said luminance signal translator and responsive to the outputs of said keyed voltage comparators, for opposing departures of the voltage attained by said first color signal voltage, during the periods of operation of said voltage comparators, from substantial equality with said reference voltage.

2. Apparatus in accordance with claim 1 wherein said first control loop (1) exhibits an effective time constant, when closed by operation of said first keyed voltage comparator, which is long relative to a line interval duration, and (2) exhibits an effective time constant, when closed by operation of said second keyed voltage comparator, which is short relative to a line interval duration.

3. Apparatus in accordance with claim 2, wherein said color-difference signal output developing means includes a pair of color demodulators for recovering first and second color-difference signals from said processed chrominance component and supplying said first and second color-difference signals as inputs to a matrix circuit which forms said plurality of color-difference signal outputs therefrom; and wherein said receiver also includes a second signal combiner, responsive to a second color-difference signal output of said matrix circuit and to said output of said luminance signal translator, for forming a second color signal; a third signal combiner, responsive to a third color-difference signal output of said matrix circuit and to said output of said luminance signal translator, for forming a third color signal; and respective means for applying said second and third color signals to respective additional ones of said beam intensity control electrodes; said DC stabilization system also including:

a second control loop for controlling the DC level of said first color-difference signal input to said matrix circuit, said second control loop including a third keyed voltage comparator for comparing the voltage attained by said second color signal during gating intervals, within those horizontal blanking portions of line intervals which lie outside of said bias control intervals, with said reference voltage; and means for modifying said first color-difference signal input to said matrix, in response to the output of said second keyed comparator means, so as to oppose departures of said attained second color signal voltage from substantial equality with said reference voltage; and a third control loop for controlling the DC level of said second color-difference signal input to said matrix circuit, said third control loop including a fourth keyed voltage comparator for comparing the voltage attained by said third color signal during gating intervals, within those horizontal blanking portions of line intervals which lie outside of said bias control intervals, with said reference voltage; and means for modifying said second color-difference signal input to said matrix circuit, in response to the output of said third keyed comparator means, so as to oppose departures of said attained third color signal voltage from substantial equality with said reference voltage.

4. Apparatus in accordance with claim 3 wherein each of said first, third and fourth keyed voltage comparators includes a capacitor for storing the output of the respective comparator during the periods intervening between successive gating intervals.

5. Apparatus in accordance with claim 4 also including a low pass filter for filtering the first color signal applied to said second input terminal of said second keyed voltage comparator, the response characteristic of said low pass filter exhibiting a break point at a midband frequency within the spectrum of frequencies occupied by said composite video signals.

6. Apparatus in accordance with claim 5 also including a gain-controlled luminance signal amplifier for delivering a luminance signal to said luminance signal translator, said gain-controlled luminance signal amplifier being effectively disabled during said bias control intervals.

7. Apparatus in accordance with claim 4 wherein said first color-difference signal comprises an I signal, wherein said second color-difference signal comprises a Q signal, and wherein said first, second and third color signals are blue, red and green signals, respectively.

* * * * *